United States Patent
Watanabe

[11] Patent Number: 6,034,755
[45] Date of Patent: Mar. 7, 2000

[54] LIQUID CRYSTAL DISPLAY

[75] Inventor: Hidetoshi Watanabe, Kanagawa, Japan

[73] Assignee: Fuji Photo Film Co., Ltd., Minami-ashigara, Japan

[21] Appl. No.: 09/236,010

[22] Filed: Jan. 22, 1999

[30] Foreign Application Priority Data

Jan. 22, 1998 [JP] Japan ................... 10-010855

[51] Int. Cl.$^7$ ................................ G02F 1/1335
[52] U.S. Cl. ................ 349/118; 349/119; 349/158; 349/177
[58] Field of Search ................ 349/117, 118, 349/119, 120, 158, 167, 177; 359/494, 500; 428/1

[56] References Cited

U.S. PATENT DOCUMENTS

| | | | |
|---|---|---|---|
| 5,757,455 | 5/1998 | Sugiyama et al. | 349/118 |
| 5,805,253 | 9/1998 | Mori et al. | 349/118 |
| 5,825,445 | 10/1998 | Okamoto et al. | 349/118 |
| 5,883,685 | 3/1999 | Mazaki et al. | 349/118 |

FOREIGN PATENT DOCUMENTS

0783128A1  7/1997  European Pat. Off. .

*Primary Examiner*—William L. Sikes
*Assistant Examiner*—Tai V. Duong
*Attorney, Agent, or Firm*—Burns, Doane, Swecker & Mathis, LLP

[57] ABSTRACT

A liquid crystal display comprises a liquid crystal cell of a bend alignment mode or a hybrid aligned nematic (HAN) mode, one or two optical compensatory sheets and one or two polarizing elements. The liquid crystal cell comprises liquid crystal molecules provided between two electrode substrates. The optical compensatory sheet comprises a transparent substrate and an optically anisotropic layer. The transparent substrate is optically anisotropic. The optically anisotropic layer contains a discotic compound. The liquid crystal cell, the optical compensatory sheet and the transparent substrate have optical characteristics satisfying the following formulas.

$|(nx1-ny1)\times d1|-20 \leq \Sigma|(nx2-ny2)\times d2| \leq |(nx1-ny1)\times d1|+20$ $50 \leq \{(n12+n22)/2-n32\}\times d2 \leq 1000$ $0 \leq |(nx3-ny3)\times d3| \leq 200$ $100 \leq \{(n13+n23)/2-n33\}\times d3 \leq 1000$ The formulas are defined in the specification.

18 Claims, 6 Drawing Sheets

51
50
52

61
60

LIQUID CRYSTAL DISPLAY

FIELD OF THE INVENTION

The present invention relates to a liquid crystal display of a bend alignment mode or a hybrid aligned nematic (HAN) mode.

BACKGROUND OF THE INVENTION

A liquid crystal display (LCD) has advantages of thin shape, light weight and low consumption of electric power, compared with a cathode ray tube (CRT). Most of the commercially available liquid crystal displays usually use a twisted nematic liquid crystal. A liquid crystal display mode is classified into a birefringent mode and anoptical rotatory mode.

In a liquid crystal display of a birefringent mode, alignment of liquid crystal molecules is twisted over 90°. The transmittance of the supper twisted nematic (STN) liquid crystal display is changed abruptly over a threshold voltage when applying voltage to the cell. Accordingly, the liquid crystal display of the birefringent mode can display a large image by a time-sharing addressing method, even though an electrode consists of a simple matrix without an active matrix (such as a thin layer transistor or diode). However, the liquid crystal display using the supper twisted liquid crystal molecule has a slow response speed (several hundreds milliseconds). Further, it is difficult for the simple matrix to display a gray scale image.

A liquid crystal display having an active matrix (e.g., TFT-LCD, MIM-LCD) uses a liquid crystal molecule twisted at 90° of an optical rotatory mode. The twisted nematic liquid crystal display (TN-LCD) has a fast response speed (several ten milliseconds). Further, the TN-LCD can display an image of high contrast. Therefore, the TN-LCD is predominant over commercially available liquid crystal displays.

Color and contrast in an image displayed in a conventional liquid crystal display depend on the viewing angle. A liquid crystal display is inferior to CRT in the viewing angle dependence.

Japanese Patent Provisional Publication No. 6(1994)-214116, and U.S, Pat. Nos. 5,583,679, 5,646,703 disclose an optical compensatory sheet using discotic compounds. The optical compensatory sheet has a function of improving the viewing angle of the liquid crystal display.

The viewing angle of the liquid crystal display has been improved by using the optical compensatory sheet. However, the improved viewing angle is still inferior to that of CRT.

SUMMARY OF THE INVENTION

U.S. Pat. Nos. 4,583,825 and 5,410,422 disclose a liquid crystal display of a bend alignment mode having a liquid crystal cell in which rod-like liquid crystal comounds are aligned symmetrically. The alignment of an upper liquid crystal compound is essentially antiparallel to the alignment of a lower liquid crystal compound. The liquid crystal cell of the bend alignment mode has a self-optically compensatory function because of the symmetrical alignment. Therefore, the bend alignment mode is also referred to as an optically compensatory bend (OCB) mode.

A liquid crystal display of a hybrid aligned nematic (HAN) mode is a reflective display to which the idea of the bend alignment mode is applied.

The liquid crystal display of the bend alignment mode or the hybrid aligned nematic mode has an advantage of a wide viewing angle. However, a further improvement is necessary to be comparable with CRT.

U.S. Pat. No. 5,805,253 (Mori et al.) and International Patent Publication No. W096/37804 (Nippon Oil Company Ltd.) propose to use an optical compensatory sheet containing a discotic compound in a liquid crystal display of a bend alignment mode or a hybrid aligned nematic mode. The viewing angle of the liquid crystal display of the bend alignment mode or the hybrid aligned nematic mode is further improved by using the optical compensatory sheet containing a discotic compound.

An object of the present invention is to furthermore improve the excellent viewing angle of a liquid crystal display of a bend alignment mode or a hybrid aligned nematic mode without degrading a front contrast of an image.

The present invention provides a liquid crystal display comprising a liquid crystal cell of a bend alignment mode, two polarizing elements arranged on each side of the liquid crystal cell, and one or two optical compensatory sheets arranged between the liquid crystal cell and each of the polarizing elements, said liquid crystal cell comprising liquid crystal molecules provided between two electrode substrates, and said optical compensatory sheet comprising an optically anisotropic transparent substrate and an optically anisotropic layer containing a discotic compound, wherein the liquid crystal cell, the optical compensatory sheet and the transparent substrate have optical characteristics satisfying the following formulas:

$$|(nx1-ny1)\times d1|-20 \leq \Sigma|(nx2-ny2)\times d2| \leq |(nx1-ny1)\times d1|+20$$

$$50 \leq \{(n12+n22)/2-n32\}\times d2 \leq 1000$$

$$0 \leq |(nx3-ny3)\times d3| \leq 200$$

$$100 \leq \{(n13+n23)/2-n33\}\times d3 \leq 1000$$

in which nx1 and ny1 are main refractive induces in plane of the liquid crystal cell; dl is the thickness in terms of nm of the liquid crystal cell; nx2 and ny2 are main refractive induces in plane of the optical compensatory sheet; d2 is the thickness in terms of nm of the optical compensatory sheet; $\Sigma|(nx2-ny2)\times d2|$ means the total value of $|(nx2-ny2)\times d2|$ of the one or two optical compensatory sheets; n12, n22 and n32 are main refractive induces of the optical compensatory sheet satisfying the formula of n12≦n22≦n32; nx3 and ny3 are main refractive induces in plane of the transparent substrate; d3 is the thickness in terms of nm of the transparent substrate; and n13, n23 and n33 are main refractive induces of the transparent substrate satisfying the formula of n13≦n23≦n33.

The invention also provides a liquid crystal display comprising a liquid crystal cell of a hybrid aligned nematic mode, an optical compensatory sheet and a polarizing element in the order, said liquid crystal cell comprising liquid crystal molecules provided between two electrode substrates, and said optical compensatory sheet comprising an optically anisotropic transparent substrate and an optically anisotropic layer containing a discotic compound, wherein the liquid crystal cell, the optical compensatory sheet and the transparent substrate have optical characteristics satisfying the following formulas:

$$|(nx1-ny1)\times d1|-20 \leq |(nx2-ny2)\times d2| \leq |(nx1-ny1)\times d1|+20$$

$$50 \leq \{(n12+n22)/2-n32\}\times d2 \leq 1000$$

$$0 \leq |(nx3-ny3)\times d3| \leq 200$$

$$100 \leq \{(n13+n23)/2 - n33\} \times d3 \leq 1000$$

in which nx1 and ny1 are main refractive induces in plane of the liquid crystal cell; d1 is the thickness in terms of nm of the liquid crystal cell; nx2 and ny2 are main refractive induces in plane of the optical compensatory sheet satisfying the formula of nx2≦ny2; d2 is the thickness in terms of nm of the optical compensatory sheet; n12, n22 and n32 are main refractive induces of the optical compensatory sheet satisfying the formula of n12≦n22≦n32; nx3 and ny3 are main refractive induces in plane of the transparent substrate; d3 is the thickness in terms of nm of the transparent substrate; and n13, n23 and n33 are main refractive induces of the transparent substrate satisfying the formula of n13≦n23n33.

DETAILED DESCRIPTION OF THE INVENTION

A liquid crystal display of a conventional TN or STN mode has a problem of a narrow viewing angle. The problem is caused by a difference in a retardation between different viewing angles.

Figure 1:
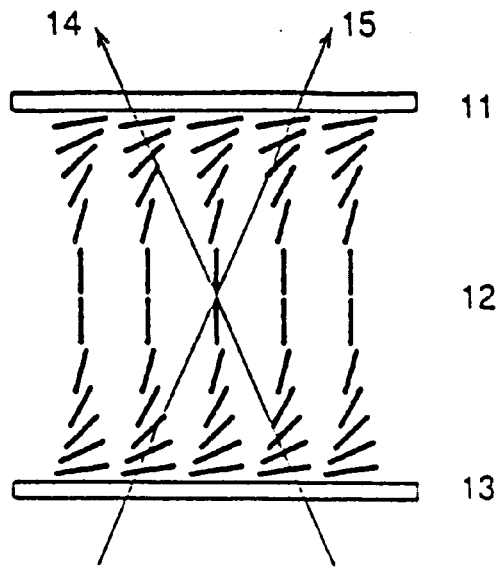
FIG. 1 is a sectional view schematically illustrating alignment in a liquid crystal cell of a conventional TN mode.

FIG. 1 is a sectional view schematically illustrating alignment in a liquid crystal cell of a conventional TN mode.

As is shown in FIG. 1, a liquid crystal cell of the TN mode comprises an upper substrate (11), a lower substrate (13) and liquid crystal molecules (12) sealed between the substrates.

When the cell is viewed along a direction (14), the retardation is relatively large because the birefringence of the liquid crystal along the direction (14) is large. On the other hand, the retardation is relatively small when the cell is viewed along a direction (15), since the birefringence of the liquid crystal along the direction (15) is small.

Figure 2:
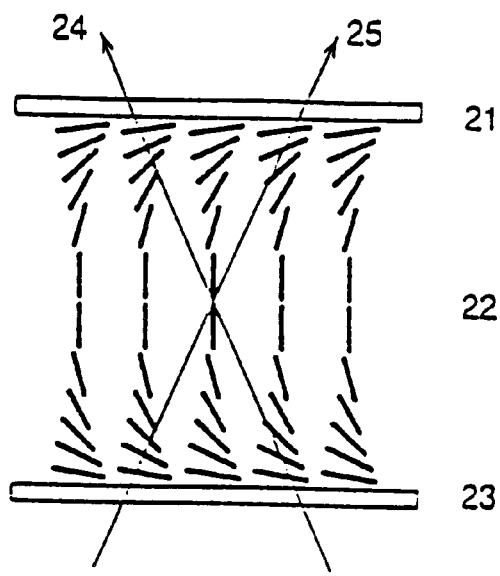
FIG. 2 is a sectional view schematically illustrating alignment in a liquid crystal cell of a bend alignment mode.

FIG. 2 is a sectional view schematically illustrating alignment in a liquid crystal cell of a bend alignment mode. The cell of FIG. 2 shows a black image, which corresponds to a normally white mode when voltage is applied to the cell or a normally black mode when voltage is not applied to the cell.

As is shown in FIG. 2, a liquid crystal cell comprises an upper substrate (21), a lower substrate (23) and liquid crystal molecules (22) sealed between the substrates. In the liquid crystal cell of the bend alignment mode, the birefringence of liquid crystal molecules (22) near the upper substrate (21) is large along a direction (24), while the birefringence of liquid crystal molecules (22) near the lower substrate (23) is small. Along another direction (25), which is symmetric with respect to the normal line of the substrates, the birefringence of liquid crystal molecules (22) near the upper substrate (21) is small, while the birefringence of liquid crystal molecules (22) near the lower substrate (23) is large. As is described above, the retardation values of the liquid crystal cell of the bend alignment mode are symmetric with respect to the normal line of the substrates. Accordingly, the cell has a function of optically compensate itself. Therefore, the cell of the bend alignment mode has a large viewing angle in principle.

Figure 3:
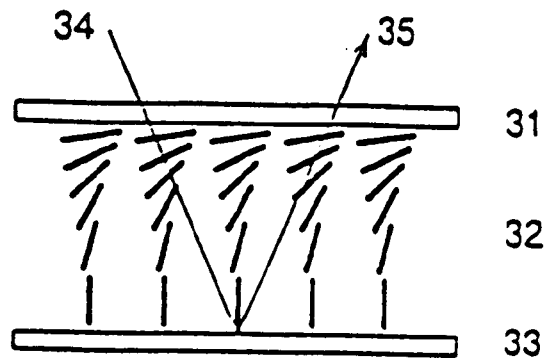
FIG. 3 is a sectional view schematically illustrating alignment in a liquid crystal cell of a hybrid aligned nematic (HAN) mode.

FIG. 3 is a sectional view schematically illustrating alignment in a liquid crystal cell of a hybrid aligned nematic (HAM) mode. The cell of FIG. 3 shows a black image, which corresponds to a normally white mode when voltage is applied to the cell or a normally black mode when voltage is not applied to the cell.

As is shown in FIG. 3, a liquid crystal cell comprises an upper substrate (31), a lower substrate (33) and liquid crystal molecules (32) sealed between the substrates. In the liquid crystal cell of the HAN mode, the birefringence of liquid crystal molecules (32) near the upper substrate (31) is large to incident light (34), while the birefringence of liquid crystal molecules (32) near the lower substrate (33) is small. To reflected light (35), the birefringence of liquid crystal molecules (32) near the upper substrate (31) is small, while the birefringence of liquid crystal molecules (32) near the lower substrate (33) is large. As is described above, the retardation values of incident light and reflected light are symmetric. Accordingly, the cell has a function of optically compensate itself. Therefore, the HAN cell has a large viewing angle in principle.

Even if the OCB or HAN cell is used, the light transmittance is increased within the black area to decrease a contrast of an image where the viewing is further enlarged. An optical compensatory sheet is used according to the present invention to keep the contrast when light is incident along an inclined direction, to improve the viewing angle and the front contrast.

A positive uniaxial liquid crystal cell (displaying black) can be optically compensated by a negative uniaxial optical compensatory sheet. The details are described below referring to FIG. 4.

Figure 4:
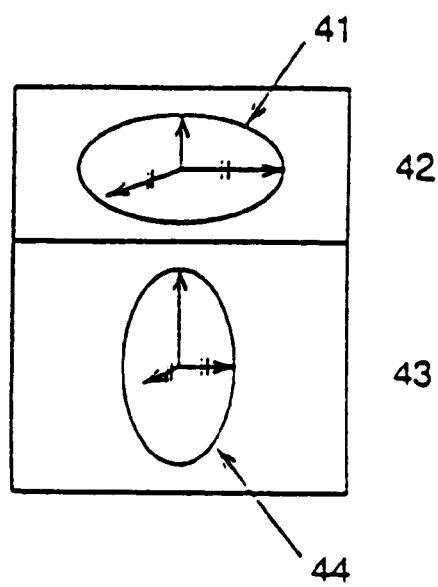
FIG. 4 schematically illustrates a refractive index ellipsoid of a positive uniaxial liquid crystal cell and a refractive index ellipsoid of a negative uniaxial optical compensatory sheet.

FIG. 4 schematically illustrates a refractive index ellipsoid of a positive uniaxial liquid crystal cell and a refractive index ellipsoid of a negative uniaxial optical compensatory sheet.

Where a positive uniaxial optical anisotropy is caused in a liquid crystal cell (43), a refractive index ellipsoid (44), which is formed by refractive indexes in plane (44x, 44y) and a refractive index along a vertical direction (44z) has a shape like a standing football. If a liquid crystal cell having a football-like (not spherical) refractive index ellipsoid is viewed along an inclined direction, retardation is caused in the cell. The retardation is canceled by a negative uniaxial optical compensatory sheet (42) to prevent transmission of light.

The negative uniaxial optical compensatory sheet (42) has a refractive index ellipsoid (41) having a shape like a pressed beach ball, which is formed by refractive indexes in plane (41x, 41y) and a refractive index along a vertical direction (41z). Therefore, the sum of 41x and 44x, the sum of 41y and 44y and the sum 4z and 44z are identical values. As a result, the retardation caused in the liquid crystal cell is canceled.

Figure 5:
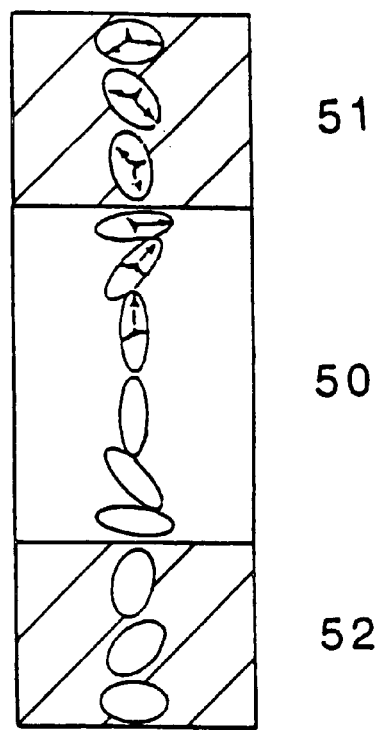
FIG. 5 is a sectional view schematically illustrating a combination of a liquid crystal cell of a bend alignment mode and two optical compensatory sheets.

FIG. 5 is a sectional view schematically illustrating a combination of a liquid crystal cell of a bend alignment mode and two optical compensatory sheets.

As is shown in FIG. 5, the two optical compensatory sheets are preferably so arranged that the liquid crystal cell of the bend alignment mode (50) is provided between the optically anisotropic layers (51, 52). The discotic liquid crystal molecules of the optically compensatory sheets (51, 52) are aligned corresponding to (optically compensating) the alignment of the liquid crystal molecule of the liquid crystal cell of the bend alignment mode.

Figure 6:
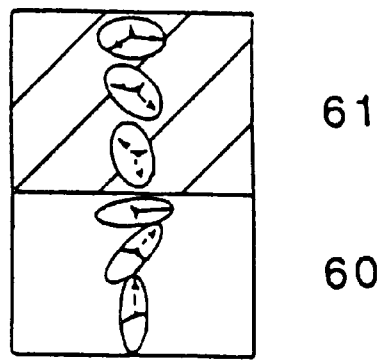
FIG. 6 is a sectional view schematically illustrating a combination of a liquid crystal cell of a hybrid aligned nematic (HAN) mode and an optical compensatory sheet.

FIG. 6 is a sectional view schematically illustrating a combination of a liquid crystal cell of the HAN mode and one optical compensatory sheet.

As is shown in FIG. 6, the optical compensatory sheet is preferably so arranged that the optically anisotropic layer (61) is provided on the display surface of the liquid crystal cell of the HAN mode (60). The discotic liquid crystal molecules of the optically compensatory sheet (61) are aligned corresponding to (optically compensating) the alignent of the liquid crystal molecule of the liquid crystal call of the HAN mode.

As is shown in FIGS. 5 and 6, the alignment of the liquid crystal molecule of the cell of the bend alignment mode or the HAN mode can be optically compensated by the optically anisotropic layer containing a discotic compound. However, the retardation of the liquid crystal cell cannot he sufficiently corrected by only the optically anisotropic layer. Further, the retardation caused in the optically anisotropic layer cannot be corrected by the layer itself. Therefore, an optically anisotropic substrate is used to correct the retardation.

In the liquid crystal display of the bend alignment mode, the liquid crystal cell and the optical compensatory sheet have optical characteristics satisfying the following formula (1a).

$$|(nx1-ny1) \times d1|-20 \leq \Sigma|(nx2-ny2) \times d2| \leq |(nx1-ny1) \times d1|+20 \quad (1a)$$

In the formula (1a), nx1 and ny1 are main refractive induces in plane of the liquid crystal cell, d1 is the thickness in terms of nm of the liquid crystal cell, nx2 and ny2 are main refractive induces in plane of the optical compensatory sheet, d2 is the thickness in terms of nm of the optical compensatory sheet, and $\Sigma|(nx2-ny2) \times d2|$ means the total value of $|(nx2-ny2) \times d2|$ of the one or two optical compensatory sheets.

The liquid crystal cell of the bend alignment mode and the optical compensatory sheet preferably have optical characteristics satisfying the following formula (1a-1), and more preferably have optical characteristics satisfying the following formula (1a-2).

$$|(nx1-ny1) \times d1|-15 \leq \Sigma|(nx2-ny2) \times d2| \leq |(nx1-ny1) \times d1|+12 \quad (1a-1)$$

$$|(nx1-ny1) \times d1|-12 \leq \Sigma|(nx2-ny2) \times d2| \leq |(nx1-ny1) \times d1|+12 \quad (1a-2)$$

In the formulas (1a-1) and (1a-2), nx1, ny1, d1, nx2, ny2, d2 and $\Sigma|(nx2-ny2) \times d2|$ have the same meanings as those defined in the formula (1a).

In the liquid crystal display of the HAN mode, the liquid crystal cell and the optical compensatory sheet have optical characteristics satisfying the following formula (1b).

$$|(nx1-ny1) \times d1|-20 \leq |(nx2-ny2) \times d2| \leq |(nx1-ny1) \times d1|+20 \quad (1b)$$

In the formula (1b), nx1 and ny1 are main refractive induces in plane of the liquid crystal cell, d1 is the thickness in terms of nm of the liquid crystal cell, nx2 and ny2 are main refractive induces in plane of the optical compensatory sheet, and d2 is the thickness in terms of nm of the optical compensatory sheet.

The liquid crystal cell of the HAN mode and the optical compensatory sheet preferably have optical characteristics satisfying the following formula (1b-1), and more preferably have optical characteristics satisfying the following formula (1b-2).

$$|(nx1-ny1)|d1|-15 \leq |(nx2-ny2) \times d2| \leq |(nx1-ny1) \times d1|+12 \quad (1b-1)$$

$$|(nx1-ny1) \times d1|-12 \leq |(nx2-ny2) \times d2| \leq |(nx1-ny1) \times d1|+12 \quad (1b-2)$$

In the formulas (1b-1) and (1b-2), nx1, ny1, d1, nx2, ny2 and d2 have the same meanings as those defined in the formula (1b).

The optical compensatory sheet further has optical characteristics satisfying the following formula (2b).

$$50 \leq \{(n12+n22)/2-n32\} \times d2 \leq 1000 \quad (2b)$$

In the formula (2b), n12, n22 and n32 are main refractive induces of the optical compensatory sheet satisfying the formula of $n12 \leq n22 \leq n32$, and d2 is the thickness in terms of nm of the optical compensatory sheet.

The optical compensatory sheet preferably has the optical characteristics satisfying the following formula (2b-1), and more preferably has the he optical characteristics satisfying the following formula (2b-2).

$$80 \leq \{(n12+n22)/2-n32\} \times d2 \leq 800 \quad (2b-1)$$

$$100 \leq \{(n12+n22)/2-n32\} \times d2 \leq 500 \quad (2b-2)$$

In the formulas (2b-1) and (2b-2), n12, n22, n32 and d2 have the same meanings as those defined in the formula (2b).

The above-mentioned optical characteristics of the optical compensatory sheet are obtained by adjusting optical characteristics of a transparent substrate.

The transparent substrate has optical characteristics satisfying the following formula (3a).

$$0 \leq |(nx3-ny3) \times d3| \leq 200 \quad (3a)$$

In the formula (3a), nx3 and ny3 are main refractive induces in plane of the transparent substrate, and d3 is the thickness in terms of nm of the transparent substrate.

The transparent substrate preferably has optical characteristics satisfying the following formula (3a-1), and more preferably has optical characteristics satisfying the following formula (3a-2).

$$10 \leq |(nx3-ny3) \times d3| \leq 150 \quad (3a-1)$$

$$20 \leq |(nx3-ny3) \times d3| \leq 100 \quad (3a-2)$$

In the formulas (3a-1) and (3a-2), nx3, ny3 and d3 have the same meanings as those defined in the formula (3a).

The transparent substrate further has optical characteristics satisfying the following formula (3b).

$$100 \leq \{(n13+n23)/2-n33\} \times d3 \leq 1000 \quad (3b)$$

In the formula (3b), n13, n23 and n33 are main refractive induces of the transparent substrate satisfying the formula of n13≦n23≦n33, and d3 is the thickness in terms of nm of the transparent substrate.

The transparent substrate preferably has optical characteristics satisfying the following formula (3b-1), and more preferably has optical characteristics satisfying the following formula (3b-2).

$$100 \leq \{(n13+n23)/2-n33\} \times d3 \leq 800 \quad (3b\text{-}1)$$

$$100 \leq \{(n13+n23)/2-n33\} \times d3 \leq 800 \quad (3b\text{-}2)$$

In the formulas (3b-1) and (3b-2), n13, n23, n33 and d3 have the same meanings as those defined in the formula (3b).

The above-mentioned optical characteristics of the optical compensatory sheet are further adjusted by arranging the optically anisotropic layer and the transparent support. The slow axis of the optically anisotropic layer is preferably parallel to the slow axis of the transparent support. The slow axis means a direction showing the maximum refractive index. The rubbing direction of the optical anisotropic layer is generally perpendicular to the slow axis of the layer. The slow axis of the transparent support generally corresponds to the stretching direction of the support.

The optical compensatory sheet comprises an optically anisotropic transparent substrate and an optically anisotropic layer containing a discotic compound. An orientation layer is preferably provided between the transparent substrate and the optically anisotropic layer. Where two or more optically anisotropic layers are formed on the substrate, the orientation layer can be provided between the optically anisotropic layers. An undercoating layer (an adhesive layer) can be provided between the transparent substrate and the orientation layer. A protective layer can be provided on a surface of the optically anisotropic layer or on a back surface of the transparent substrate.

The transparent substrate can comprise two or more optically anisotropic films to obtain the above-described optical characteristics of the substrate and the optical compensatory sheet. The optical characteristics of the substrate can be adjusted by arranging slow axes of the two or more optically anisotropic films.

At least one transparent substrate can function as a protective film of a polarizing element. The polarizing membrane is attached to the transparent substrate to form the polarizing element.

The transparent substrate can be made of a uniaxially or biaxially stretched film. The film can be biaxially stretched according to a conventional combination of a longitudinal stretching process and a latitudinal stretching process.

A transparent substrate preferably is a polymer film made of a transparent polymer of positive inherent birefringence. The transparent substrate means that light transmittance is not less than 60% (preferably not less than 80%).

Examples of the polymers include polycarbonate, polyarylate, polysulfone, polyethersulfone, diacetyl cellulose and triacetyl cellulose. Polycarbonate and diacetyl cellulose and triacetyl cellulose are preferred.

The transparent substrate can also comprise a transparent film and a liquid crystal layer containing positively uniaxial liquid crystal molecules.

The liquid crystal layer can be formed by adding positively uniaxial liquid crystal molecules to a polymer matrix (described in Japanese Patent Provisional Publication No. 7(1995)-35924). The liquid crystal layer can be formed by polymerizing (polymerizable) positively uniaxial liquid crystal molecules, and coating them on the transparent film (described in Japanese Patent Provisional Publication No. 7(1995)-181324).

The positively uniaxial liquid crystal molecules are described in the Elements of Chemistry, vol. 22, Chemistry of Liquid Crystal (Japan Chemical Society, 1994, written in Japanese).

The liquid crystal layer preferably is substantially transparent and colorless. The light transmittance of the layer preferably is not less than 60%.

The polymer matrix can be obtained by a natural polymer (e.g., gelatin, carrageenan) or a synthetic polymer (e.g., polyvinyl alcohol, polyamide, polyimide, polyacry late, polyvinyl, polyacrylonitrile, polystyrene, cellulose derivatives).

The polymerizable positively uniaxial liquid crystal molecules are described in Kelker Hans, Liquid Crystal Handbook, pages 412 to 424 (Verlag Chemie GmbH, 1980).

An undercoating layer is preferably provided between the transparent substrate and the orientation layer to improve the adhesion between the substrate and the layer.

Before forming the undercoating layer, the transparent substrate is preferably subjected to a surface treatment. Examples of the surface treatments include a chemical treatment, a mechanical treatment, a corona discharge treatment, a flame treatment, an ultraviolet (UV) treatment, a high frequency wave treatment, a glow discharge treatment, an active plasma treatment and an ozone oxidation treatment.

The undercoating layer can comprise a first undercoating layer and a second undercoating layer. The first undercoating layer is well adhered to the transparent substrate, and the second undercoating layer is well adhered to the orientation layer. A single undercoating layer preferably contains a resin having a hydrophobic group and a hydrophilic group to be adhered to the transparent substrate and the orientation layer.

The first undercoating layer contains a binder polymer. Examples of the polymers include polyvinyl chloride, polyvinylidene chloride, polybutadiene, polystyrene, polyacrylonitrile, polymethacrylonitrile, polyacrylic ester, polymethacrylic ester, polyacrylic acid, polymethacrylic acid, polyitaconic acid, polymaleic anhydride and a copolymer thereof. Polyethylene imine, an epoxy resin, gelatin, nitro cellulose and acetyl cellulose can also be used as the binder polymer. The first undercoating layer can further contain a cross-linking agent (e.g., triazines, epoxy compounds, melamine compounds, isocyanates, blocked isocyanates, aziridines, oxazalines), inorganic particles (e.g., colloidal silica), a surface active agent, a viscosity increasing agent, a dye and a preservative. The additives of the undercoating layers are described in E. H. Inmmergut, Polymer Handbook, IV, pages 187 to 231 (Interscience Pub., New York, 1966), and Japanese Patent Provisional Publication Nos. 48(1973)-89870, 48(1973)-93672, 50(1975)-39528, 50(1975)-47196, 50(1975)-63881, 51(1976)-133526, 63(1988)-174698, 64(1989)-538, 1(1989)-240965 and 2(1990)-184844.

The second undercoating layer usually is a gelatin layer.

The single undercoating layer usually has a function of swelling the transparent substrate. The single undercoating layer contains a hydrophilic polymer, which is mixed with the swelled transparent substrate to improve the adhesion. The hydrophilic polymers include a water-soluble polymer, cellulose derivatives, a latex polymer and a water-soluble polyester. Examples of the water-soluble polymers include gelatin, a gelatin derivative, casein, agaragar, sodium arginate, starch, polyvinyl alcohol, acrylic acid copolymer and maleic anhydride copolymaer. Examples of the cellulose derivatives include carboxymethyl cellulose and hydroxyethyl cellulose. Examples of the latex polymers include vinyl chloride copolymer, vinylidene chloride copolymer, acrylic ester copolymer, vinyl acetate copolymer and butadiene copolymer. Gelatin is most preferred. The gelatins include lime-treated gelatin, acid treated gelatin, gelatin derivatives and denatured gelatin. Gelatin can contain impurities in an amount of 0.11 to 20,000 ppm. The impurities include metals (e.g., Na, K, Li, Rb, Ca, Mg, Ba, Ce, Fe, Sn, Pb, Al, Sc, Ti, Au, Ag, Zn, Ni), cations thereof, other cations (e.g., ammonium ion) and anions (e.g., halide ion, sulfate ion, nitrate ion, acetate ion). The lime-treated gelatin usually contains Ca or Mg ion in an amount of 10 to 3,000 ppm. The amount of the impurities is more preferably less than 1,000 ppm, and most preferably less than 500 ppm.

The following polymers (P-1) to (P-5) can also be used in the undercoating layer.

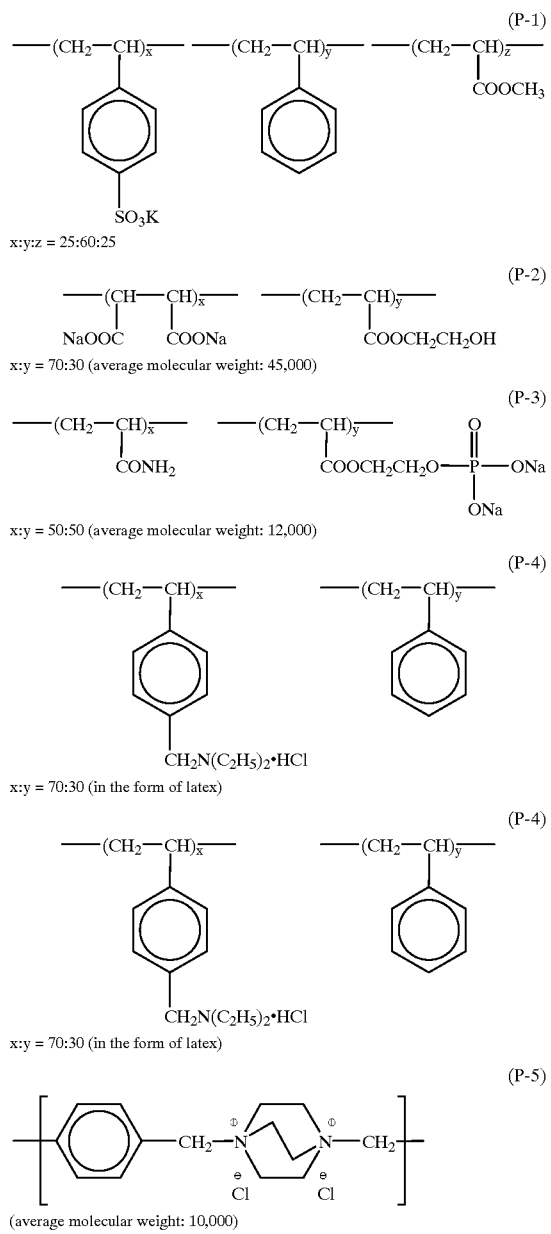

A coating solution of the undercoating layer may further contain other additives, such as a surface active agent, an antistatic agent, a pigment and a coating aid.

The undercoating layer can contain a hardening agent for gelatin. Examples of the hardening agents include chromium salts (e.g., chrome alum), aldehydes (e.g., formaldehyde, glutaraldehyde), isocyanates, epichlorohydrin resins, polyamide-epichlorohydrin resins, cyanuric chlorides, vinylsulfones, sulfonyl compounds, carbamoyl amonium salts, amidinium salts, carbodiimides and pyridinium salts.

The undercoating layer can further contain inorganic or organic particles as a matting agent. The matting agent should not affect the transparency of the layer.

Examples of the inorganic particles include silica ($SiO_2$) particles, titanium dioxide ($TiO_2$) particles, calcium carbonate particles and magnesium carbonate particles.

Examples of the organic particles include polymethyl methacrylate particles, cellulose acetate propionate particles and polystyrene particles. The polymers disclosed in U.S. Pat. No. 4,142,894 can also be used as the organic particles.

The matting agent has an average particle size preferably in the range of 0.01 to 10 $\mu$m, and more preferably in the range of 0.05 to 5 $\mu$m. The amount of the matting agent is preferably in the range of 0.5 to 600 mg per m$^2$, and more preferably in the range of 1 to 400 mg per m$^2$.

The transparent substrate has a thickness preferably in the range of 20 to 500 $\mu$m, and more preferably in the range of 50 to 200 $\mu$m.

The undercoating layer has a thickness preferably in the range of 0.1 to 2 $\mu$m, and more preferably in the range of 0.2 to 1 $\mu$m.

An orientation layer is usually provided on the transparent substrate or the undercoating layer. The orientation layer has a function of aligning discotic compounds.

The orientation layer can be formed by rubbing treatment of an organic compound (preferably a polymer), oblique evaporation of an inorganic compound, formation of a micro groove layer, or stimulation of an organic compound (e.g., ω-tricosanoic acid, dioctadecylmethylanmonium chloride, methyl stearate) according to a Langmuir-Blodgett method. Further, the aligning function of the orientation layer can be activated by applying an electric or magnetic field to the layer or irradiating the layer with light.

The orientation layer is preferably formed by rubbing an organic compound. Emles of the organic compounds include polymethyl methacrylate, acrylic acid-methacrylic acid copolymer, styrene-maleic imide copolymer, polyvinyl alcohol, poly(N-methylolacrylamide), styrene-vinyltoluene copolymer, chlorosulfonated polyethylene, nitrocellulose, polyvinyl chloride, polyolefin chloride, polyester, polyimide, vinyl acetate-vinyl chloride copolymer, ethylenevinyl acetate copolymer, carboxethyl cellulose, polyethylene, polypropylene, polycarbonate and silane coupling agent. Polyimide, polystyrene, polystyrene derivative, gelatin, polyvinyl alcohol, denatured polyvinyl alcohol (preferably denatured with an alkyl group, more preferably denatured with an alkyl group having 6 or more carbon atoms) are more preferred. The orientation layer made from the above-mentioned polymer has a function of aligning discotic compounds obliquely.

The polymer preferably is polyvinyl alcohol. A denatured polyvinyl alcohol having a hydrophobic group is particularly preferred. The discotic compound can uniformly be aligned by introducing the hydrophobic group into polyvinyl alcohol because the hydrophobic group has an affinity with the discotic compound. The hydrophobic group is attached to the side chain or the end of the main chain of polyvinyl alcohol.

The hydrophobic group preferably is an aliphatic group (more preferably an alkyl group or an alkenyl group) having 6 or more carbon atoms or an aromatic group.

In the case that the hydrophobic group is attached to the end of the main chain, a linking group is preferably introduced between the hydrophobic group and the end of the main chain. Examples of the linking group include —S—, —C(CN)R$^1$—, —NR$^2$—, —CS— and combinations thereof. Each of R$^1$ and R$^2$ is hydrogen or an alkyl group having 1 to 6 carbon atoms, and preferably is an alkyl group having 1 to 6 carbon atoms.

In the case that the hydrophobic group is attached to the side chain, the acetyl group of the vinyl acetate units in polyvinyl alcohol is partially replaced with an acyl group (—CO—R$^3$) having 7 or more carbon atoms, R$^3$ is an aliphatic group having 6 or more carbon atoms or an aromatic group.

Commercially available denatured polyvinyl alcohols (e.g., MP103, MP203, R1130, Kuraray Co., Ltd.) can be used in the orientation layer, The (denatured) polyvinyl alcohol has a saponification degree preferably of not smaller than 80%. The (denatured) polyvinyl alcohol has a polymerization degree preferably of not smaller than 200. The following denatured polyvinyl alcohols are preferably used in the orientation layer.

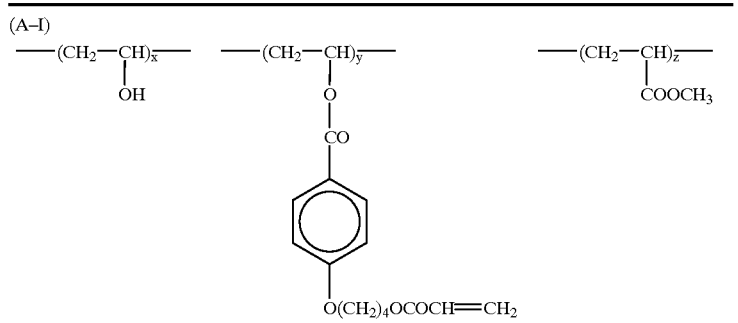

|     | x      | y     | z (mol %) |
|-----|--------|-------|-----------|
| (A) | 87.8   | 0.2   | 12        |
| (B) | 87.997 | 0.003 | 12        |
| (C) | 87.86  | 0.14  | 12        |
| (D) | 87.94  | 0.06  | 12        |
| (E) | 86.9   | 1.1   | 12        |
| (F) | 98.5   | 0.5   | 1         |
| (G) | 97.8   | 0.2   | 2         |
| (H) | 96.5   | 2.5   | 1         |
| (I) | 94.9   | 4.1   | 1         |

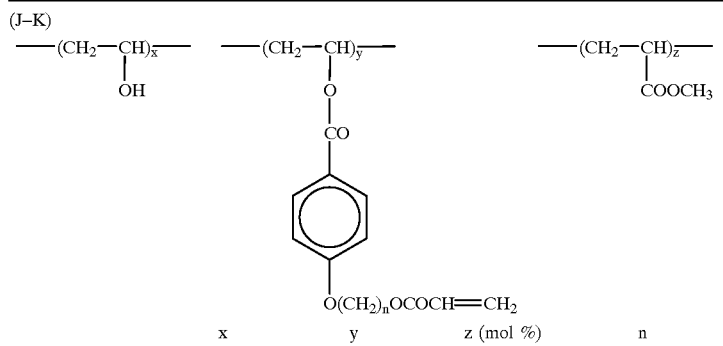

|     | x     | y    | z (mol %) | n |
|-----|-------|------|-----------|---|
| (J) | 87.8  | 0.2  | 12        | 3 |
| (K) | 87.85 | 0.15 | 12        | 5 |
| (L) | 87.7  | 0.3  | 12        | 6 |
| (M) | 87.7  | 0.3  | 12        | 8 |

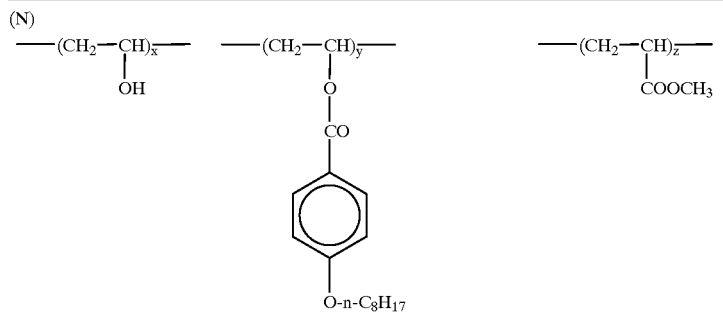

x:y:z = 96.2:1.8:2

-continued (O)
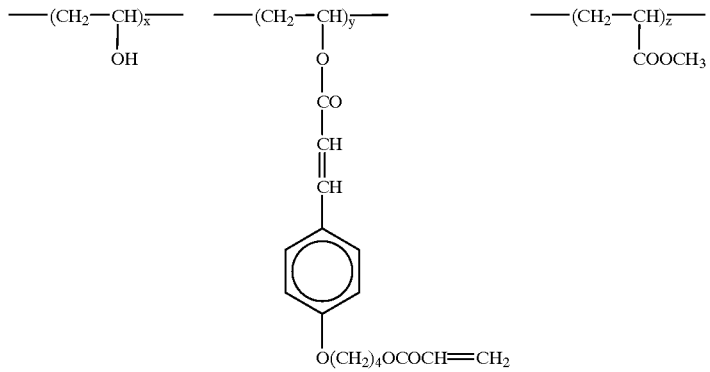

x:y:z = 84.2:0.8:15

(P)
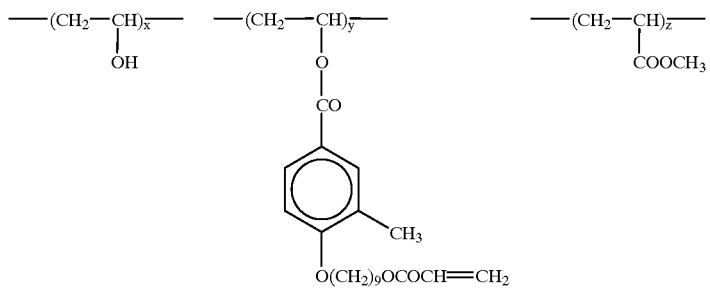

x:y:z = 94.9:3.1:12

(Q)
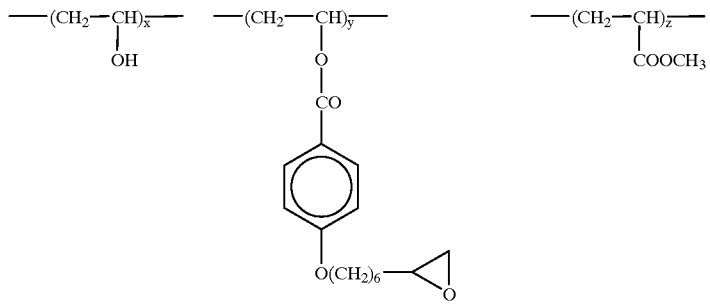

x:y:z = 87.5:2.5:10

A polyimide (preferably a polyimide containing fluorine) membrane can also be used as the orientation layer. The polyimide membrane can be formed by coating a polyamic acid (for example, LQ or LX series of Hitachi Chemical Industries Ltd. or Se series of Nissan Chemical Industries Ltd.) on a transparent substrate or an undercoating layer and heating the coated layer at 100 to 300° C. for 0.5 to 1 hour.

The orientation layer preferably is a hardened membrane. The hardened membrane can be formed by hardening a polymer with a cross-linking agent or by introducing a reactive group into the polymer. Examples of the hardening agents include isocyanate compounds and epoxy compounds.

The rubbing treatment can be conducted by rubbing the layer with a paper, a rubber or a cloth several times along a certain direction. A cloth is preferred to a paper or a rubber. A gauze, a felt, a nylon cloth or a polyester cloth is preferably used. The cloth preferably uniformly contains uniform (about length and thickness) fibers.

The orientation layer can also be formed by oblique evaporation of an inorganic compound. Examples of the inorganic compounds include metal oxides (e.g., $SiO_2$, $TiO_2$, $ZnO_2$), metal fluorides (e.g., $MgF_2$) and metals (e.g., Au, Al). Metal oxides are preferred, and $SiO_2$ is most preferred. The metal oxides preferably has a high permittivity.

The oblique evaporation of the inorganic compound can be conducted by using an evaporation machine. The evaporation is conducted by fixing a transparent substrate or continuously moving a roll of the transparent substrate.

The optically anisotropic layer is formed on the transparent substrate or the orientation layer. The optically anisotropic layer contains a discotic compound. An optically anisotropic layer is preferably formed by aligning a discotic compound by an orientation layer, and fixing the alignment of the discotic compound. The discotic compound is fixed preferably by a polymerization reaction.

The discotic compound preferably is negative uniaxial, and preferably is obliquely aligned. The discotic compound preferably has a hybrid alignment, wherein the inclined angles (between the discotic planes and the planes parallel to the transparent substrate) are changed along a normal line of the transparent substrate. Accordingly, the discotic compound preferably is aligned in the optically anisotropic layer, and an angle between the discotic plane of the discotic compound and a surface of the transparent substrate preferably increases or decreases (more preferably increases) with increase of a distance between the discotic plane and the surface of the transparent substrate.

The discotic compound has an optic axis along a normal line of the discotic plane. The birefringence along the discotic plane is larger than that along the optic axis. The minimum retardation value in the optically anisotropic layer is preferably larger than 0. In other words, a direction having retardation of 0 preferably is not present in the optically anisotropic layer.

The discotic (liquid crystal) compound is described in various documents (C. Destrade et al., Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic compound is described in Japanese Patent Provisional Publication No. 8(1996)-27284.

A polymerizable group should be bound to a discotic core of the discotic compound to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic compound having a polymerizable group preferably is a compound represented by the following formula (I).

(I) D(-L-P)$_n$ in which D is a discotic core; L is a divalent linking group; P is a polymerizable group; and n is an integer of 4 to 12.

Examples of the discotic cores (D) are shown below. In the examples, LP (or PL) means the combination of the divalent linking group (L) and the polymerizable group (P).

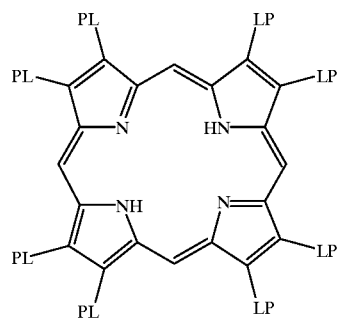

(D1)

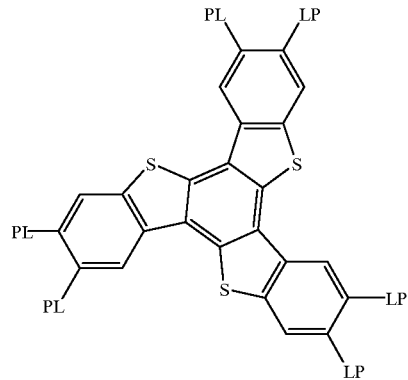

(D2)

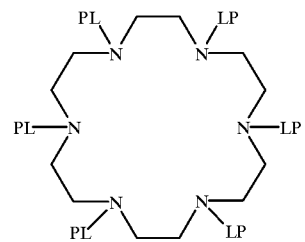

(D3)

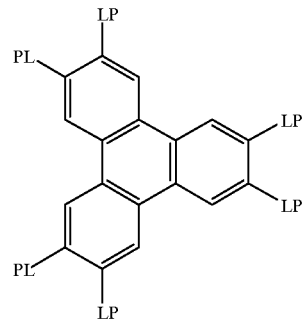

(D4)

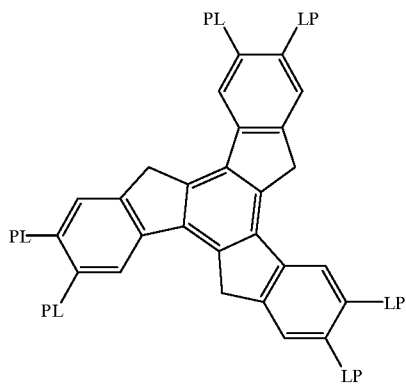

(D5)

(D6)
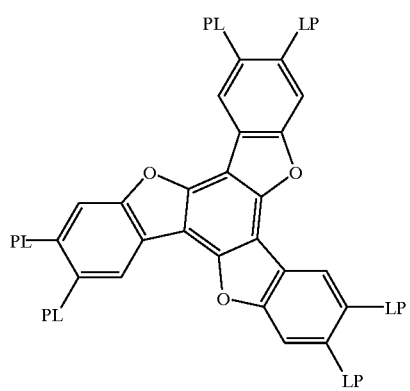
(D7)
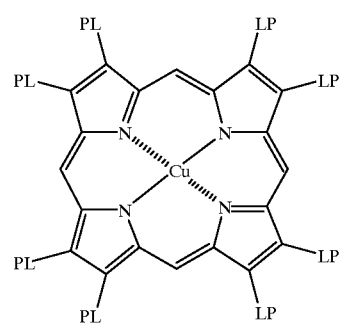
(D8)
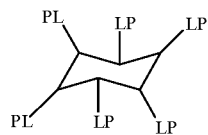
(D9)
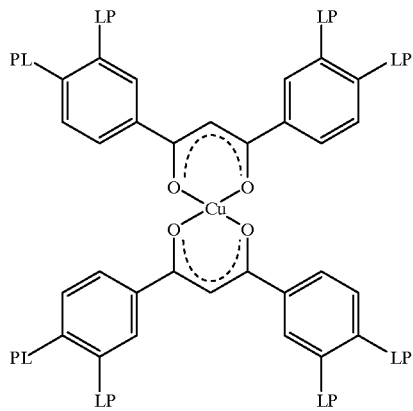
(D10)
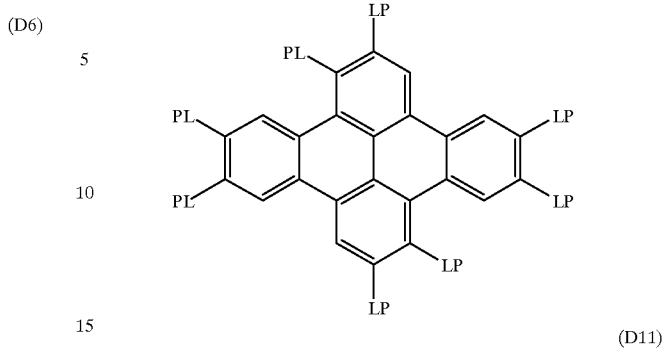
(D11)
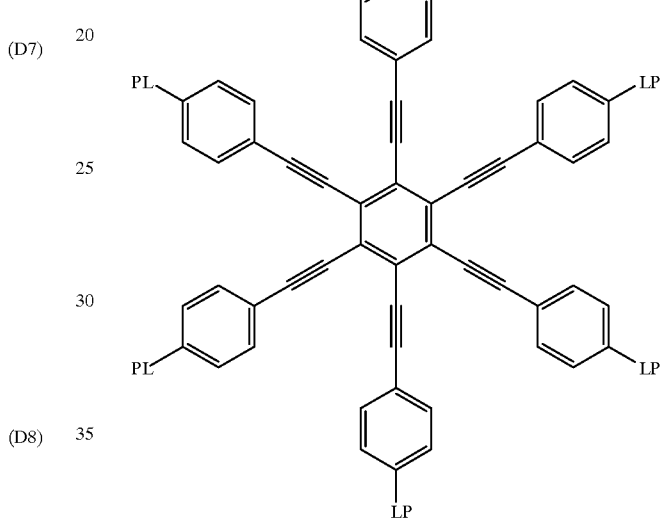
(D12)
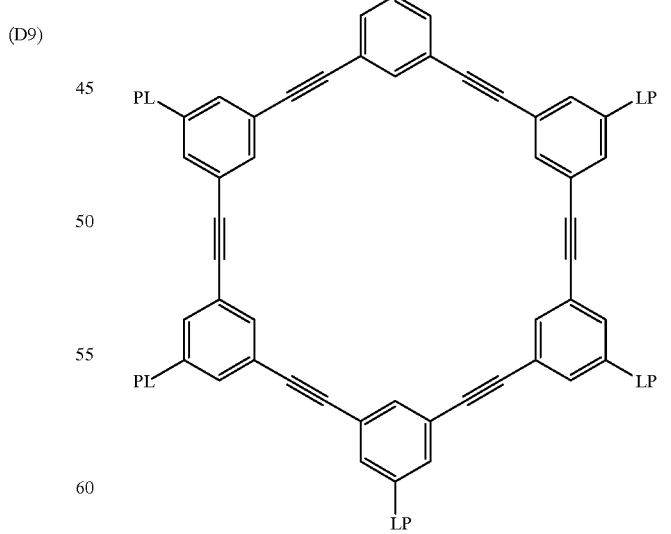

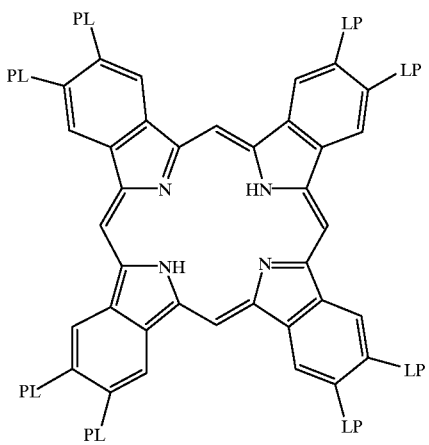
(D13)

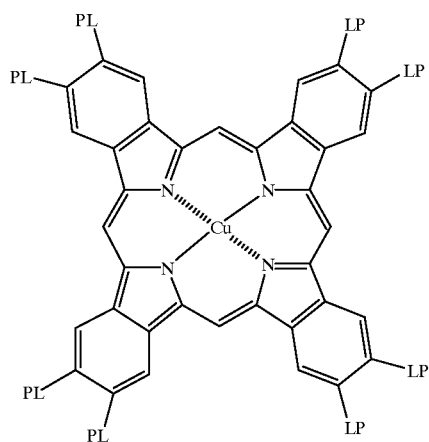
(D14)

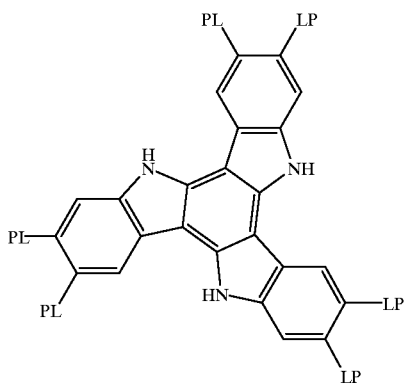
(D15)

In the formula (I), the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an arylene group, —CO—, —NH—, —O— and —S—. L more preferably is a divalent linking group comprising at least two divalent groups selected from the group consisting of an alkylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms.

Examples of the divalent linking groups (L) are shown below. In the examples, the left side is attached to the discotic core (D), and the right side is attached to the polymerizable group (P). The AL means an alkylene group or an alkenylene group. The AR means an arylene group. The alkylene group, the alkenylene group and the arylene group may have a substituent group (e.g., an alkyl group).

L1: —AL—CO—O—AL—O—CO—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—CO—
L19: —O—CO—AR—O—AL—O—AL—O—CO—
L20: —O—CO—AR—O—AL—O—AL—O—AL—O—CO—
L21: —S—AL—
L22: —S—AL—O—
L23: —S—AL—O—CO—
L24: —S—AL—S—AL—
L25: —S—AR—AL—

The polymerizable group (P) is determined by the polymerization reaction. Examples of the polymerizable groups (P) are shown below.

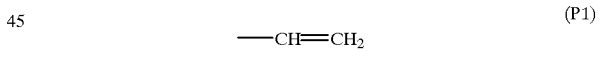
(P1)

(P2)

(P3)

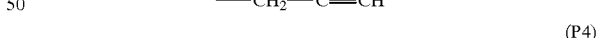
(P4)

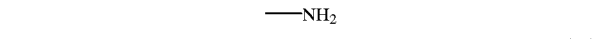
(P5)

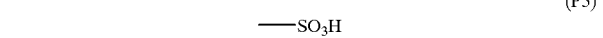
(P6)

(P7)

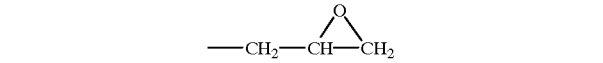
(P8)

(P9)

-continued

—SH (P10)

—CHO (P11)

—OH (P12)

—CO$_2$H (P13)

—N=C=O (P14)

—CH=CH—C$_2$H$_5$ (P15)

—CH=CH-n-C$_3$H$_7$ (P16)

—CH=C—CH$_3$
      |
      CH$_3$ (P17)

—CH—CH$_2$ (with epoxide O) (P18)

The polymerizable group (P) preferably is an unsaturated polymerizable group (P1, P2, P3, P7, P8, P15, P16, P17) or an epoxy group (P6, P18), more preferably is an unsaturated polymerizable group, and most preferably is an ethylenically unsaturated group (P1, P7, P8, P15, P16, P17).

In the formula (I), n is an integer of 4 to 12, which is determined by the chemical structure of the discotic core (D). The 4 to 12 combinations of L and P can be different from each other. However, the combinations are preferably identical.

Figure 7:
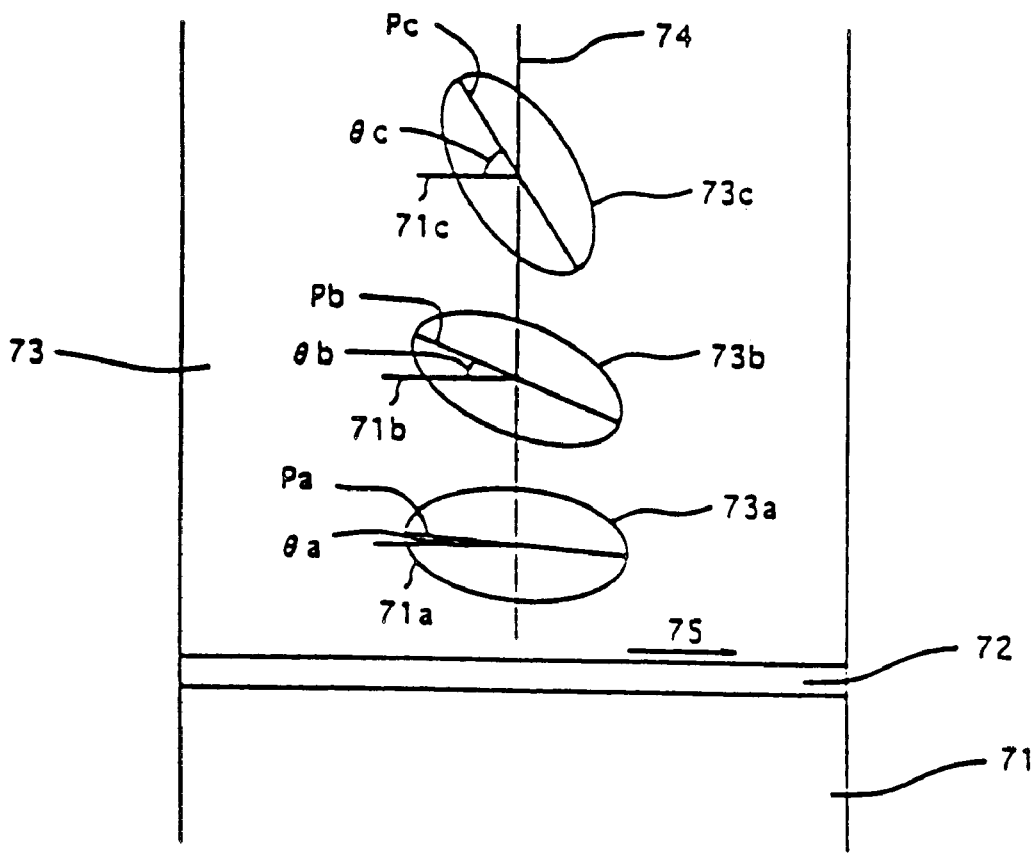
FIG. 7 is a sectional view schematically illustrating a representative embodiment of an optical compensatory sheet.

FIG. 7 is a sectional view schematically illustrating a representative embodiment of an optical compensatory sheet.

The optical compensatory sheet shown in FIG. 7 comprises a transparent substrate (71), an orientation layer (72) and an optically anisotropic layer (73) in the order. The orientation layer (72) has an aligning function caused by rubbing the layer along a direction (75).

Discotic compounds (73a, 73b, 73c) contained in the optically anisotropic layer (73) are planer molecules. Each of the molecules has only one plane, namely discotic plane (Pa, Pb, Pc). The discotic planes (Pa, Pb, Pc) are inclined to planes (71a, 71b, 71c) parallel to the surface of the transparent substrate (71). The angle between the discotic planes (Pa, Pb, Pc) and the paralleled planes (71a, 71b, 71c) are inclined angles (θa, θb, θc) As the distance between the molecule and the orientation layer (72) increases along a normal line (74) of the transparent substrate (71), the inclined angles increases (θa<θb<θc).

The inclined angles (θa, θb, θc) are preferably in the range of 0 to 60°. The minimum inclined angle is preferably in the range of 0 to 55°, and more preferably in the range of 5 to 40°. The maximum inclined angle is preferably in the range of 5 to 60°, and more preferably in the range of 20 to 60°. The difference between the minimum and maximum angles is preferably in the range of 5 to 55°, and more preferably in the range of 10 to 40°.

An optical compensatory sheet has a function of improving the viewing angle. The function can be further improved where the inclined angles are changed as is shown in FIG. 7. The optical compensatory sheet shown in FIG. 7 has another function of preventing an image from reversion, gray-scale inversion and color contamination of a displayed image.

An optically anisotropic layer can be formed by coating a solution containing the discotic compound, a polymerization initiator and other optional components on an orientation layer. The coated layer is heated to form a discotic nematic phase. The heating temperature is preferably in the range of 70 to 300° C., and more preferably in the range of 70 to 170° C.

A polymerizable monomer can be added to the optically anisotropic layer. The polymerizable groups of the monomers include vinyl, vinyloxy, acryloyl and methacryloyl. The amount of the polymerigable monomer is preferably in the range of 1 to 50 wt. %, more preferably in the range of 5 to 30 wt. % based on the amount of the discotic compound.

The optically anisotropic layer can further contain a polymer. The polymer preferably is cellulose ester. Examples of the cellulose esters include cellulose acetate, cellulose acetate propionate, cellulose hydroxyproionate and cellulose acetate butyrate. Cellulose acetate butyrate is preferred. The butyric acid content of the cellulose acetate butyrate is preferably not less than 30%, and more preferably in the range of 30 to 80%. The viscosity (measured according to ASTM-D-817-72) of the cellulose acetate butyrate is preferably in the range of 0.01 to 20 seconds. The amount of the polymer is preferably in the range of 0.1 to 10 wt. %, more preferably in the range of 0.1 to 8 wt. %, and most preferably in the range of 0.1 to 5 wt. %.

Where the discotic compound forms multi domain in the optically anisotropic layer, the domain size of the discotic compound is preferably not larger than 0.1 μm, and more preferably not larger than 0.08 μm.

The optically anisotropic layer has a thickness preferably in the range of 0.5 to 100 μm, and more preferably in the range of 0.5 to 30 μm.

The optically anisotropic layer preferably has optical characteristics satisfying the following formula (4a).

$$0 \leq |(nx4-ny4) \times d4| \leq 200 \quad (4a)$$

In the formula (4a), nx4 and ny4 are main refractive induces in plane of the optically anisotropic layer, and d4 is the thickness in terms of nm of the optically anisotropic layer.

The optically anisotropic layer more preferably has optical characteristics satisfying the following formula (4a-1), and most preferably has optical characteristics satisfying the following formula (4a-2).

$$0 \leq |(nx4-ny4) \times d4| \leq 150 \quad (4a\text{-}1)$$

$$0 \leq |(nx4-ny4) \times d4| \leq 100 \quad (4a\text{-}2)$$

In the formulas (4a-1) and (4a-2), nx4, ny4 and d4 have the same meanings as those defined in the formula (4a).

The optically anisotropic layer also preferably has optical characteristics satisfying the following formula (4b).

$$50 \leq \{(n14+n24)/2-n34\} \times d4 \leq 1000 \quad (4b)$$

In the formula (4b), n14, n24 and n34 are main retractive induces of the optically anisotropic layer satisfying the formula of n14≦n24≦n34, and d4 is the thickness in terms of nm of the optically anisotropic layer.

The optically anisotropic layer more preferably has optical characteristics satisfying the following formula (4b-l), and most preferably has optical characteristics satisfying the following formula (4b-2).

$$50 \leq \{(n14+n24)/2-n34\} \times d4 \leq 800 \quad (4b\text{-}1)$$

$$100 \leq \{(n14+n24)/2-n34\} \times d4 \leq 500 \quad (4b\text{-}2)$$

In the formulas (4b-1) and (4b-2), n14, n24, n34 and d4 have the same meanings as those defined in the formula (4b).

A solvent for the preparation of the solution preferably is an organic solvent. Examples of the organic solvents include amides (e.g., dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone), ethers (e.g., tetrahydroturan, 1,2-dimethoxyethane). Alkyl halides and ketones are preferred. Two or more organic solvents can be used in combination.

The solution can be coated according to a conventional coating method such as a curtain coating method, an extrusion coating method, a roll coating method, a spin coating method, a dip coating method, a print coating method, a spray coating method, a slide coating method. The optically anisotropic layer is preferably coated continuously. The layer can be continuously coated according to the curtain coating method, the roll coating method or the slide coating method.

The aligned discotic compound is preferably fixed while keeping the alignment. The compound is fixed preferably by a polymerization reaction. The polymerization reaction can be classified a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S, Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray. The exposure energy is preferably in the range of 20 to 5,000 mj, and more preferably in the range of 100 to 800 mJ. The light irradiation can be conducted while heating the layer to accelerate the photo polymerization reaction.

The optical anisotropic layer has retardation values measured at the wavelength of 450 nm (R450) and at the wavelength of 600 nm (R600). which preferably satisfy the formula of $R450/R600 \leq 1.0$, and more preferably satisfy the formula of $1.0 \leq R450/R600 \leq 1.3$.

Figure 8:
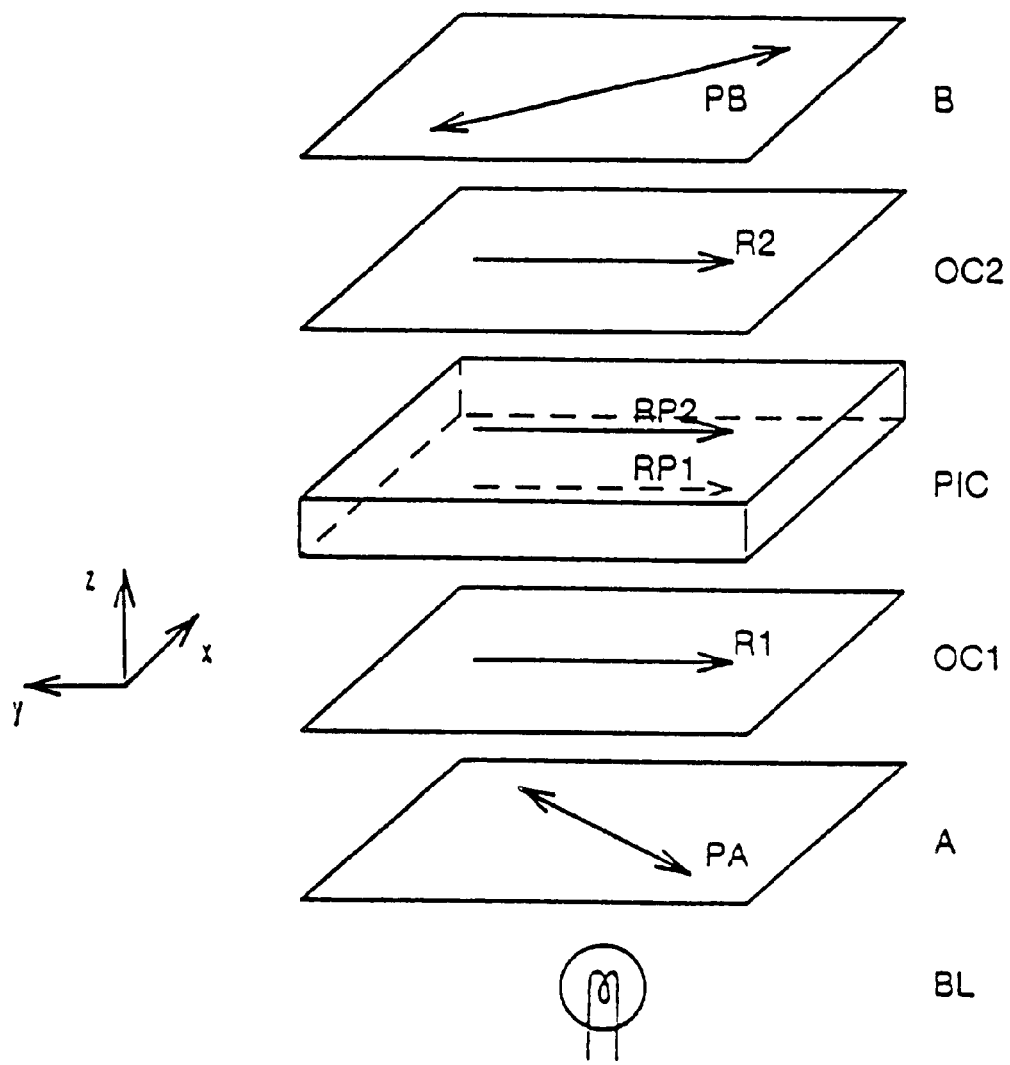
FIG. 8 is a sectional view schematically illustrating a representative embodiment of a liquid crystal display of a bend alignment mode.

FIG. 8 is a sectional view schematically illustrating a representative embodiment of a liquid crystal display of a bend alignment mode.

The liquid crystal display shown in FIG. 8 comprises a liquid crystal cell of a bend alignment mode (PIC), a pair of polarizing elements (A, B) arranged on both sides of the liquid crystal cell, a pair of optical compensatory sheets (OC1, OC2) arranged between the liquid crystal cell and the polarizing elements, and a back light (BL). The pair of the optical compensatory sheets (OC1, OC2) are arranged, as is shown in FIG. 8. However, only one optical compensatory sheet can be arranged on one side of the liquid crystal cell.

The arrows (R1, R2) in the optical compensatory sheets (OC1, OC2) mean rubbing directions of orientation layers provided on the optical compensatory sheets. In the liquid crystal display shown in FIG. 8, optically anisotropic layers of the optical compensatory sheets (OC1, OC2) are attached to the liquid crystal cell (PIC). The optically anisotropic layers can also be attached to the polarizing elements (A, B). The rubbing directions of an orientation layer (R1, R2) should be reversed where the optically anisotropic layers are attached to the polarizing elements.

The arrows (RP1, RP2) in the liquid crystal cell (PIC) mean the rubbing directions of orientation layers provided on the cell substrates.

The arrows (PA, PB) in the polarizing elements (A, B) mean the transmission axes of light polarized in the elements.

The rubbing directions in the optical compensatory sheets (R1, R2) is preferably essentially parallel (or reversal parallel) to the rubbing directions in the liquid crystal cell (RP1, RP2). The transmission axes of the polarizing elements (PA, PB) are preferably essentially parallel or perpendicular to each other.

The term "essentially parallel (or reversal parallel) or perpendicular" means that a margin for error based on the exactly parallel (or reversal parallel) or perpendicular angle is in the range of ±b 20°. The margin for error is preferably in the range of ±15°, more preferably in the range of ±10°, and most preferably in the range of ±5°.

The angle between the rubbing directions in the liquid crystal cell (RP1, RP2) and the transmission axes of the polarizing elements (PA, PB) is preferably in the range of 10 to 80°, more preferably in the range of 20 to 70°, and most preferably in the range of 35 to 55°.

Figure 9:
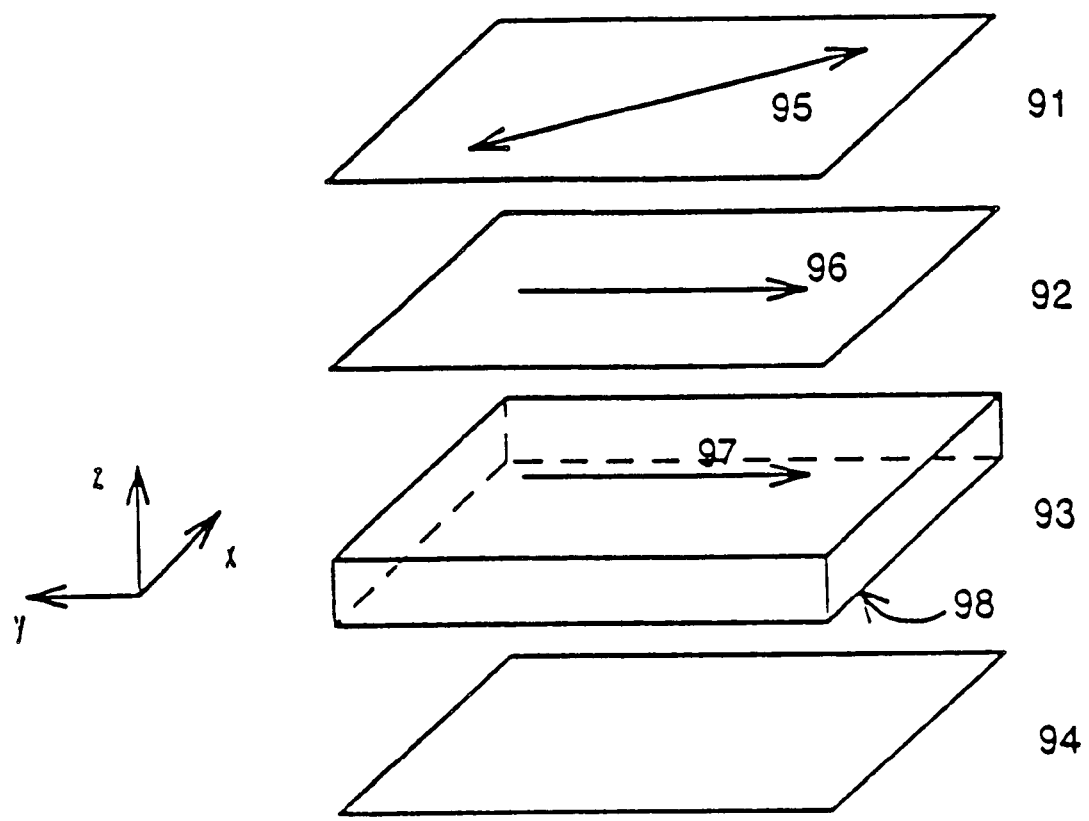
FIG. 9 is a sectional view schematically illustrating a representative embodiment of a reflective liquid crystal display of a hybrid aligned nematic (HAN) mode.

FIG. 9 is a sectional view schematically illustrating a representative embodiment of a reflective liquid crystal display of a hybrid aligned nematic (HAN) mode.

The liquid crystal display shown in FIG. 9 comprises a liquid crystal cell of a hybrid aligned nematic mode (93, a polarizing element (91) arranged on the display side of the liquid crystal cell, an optical compensatory sheet (92) arranged between the liquid crystal cell and the polarizing element, and a reflection board (94).

The arrow (95) in the optical compensatory sheet (92) means a rubbing direction of an orientation layer provided on the optical compensatory sheet.

The arrow (97) in the liquid crystal cell (93) means a rubbing direction of an orientation layer provided on the cell substrates.

The arrow (95) in the polarizing element (91) means the transmission axis of light polarized in the element.

The rubbing direction in the optical compensatory sheet (96) is preferably essentially parallel (or reversal parallel) to the rubbing direction in the liquid crystal cell (97).

The term "essentially parallel (or reversal parallel) or perpendicular " means that a margin for error based on the exactly parallel (or reversal parallel) or perpendicular angle is in the range of ±20°. The margin for error is preferably in the range of ±15°, more preferably in the range of ±10°, and most preferably in the range of ±5°.

The angle between the rubbing direction in the liquid crystal cell (97) and the transmission axis of the polarizing element (95) is preferably in the range of 10 to 80°, more preferably in the range of 20 to 70°, and most preferably in the range of 35 to 55°.

The optical compensatory sheet used in the liquid crystal display of the bend alignment or HAN mode has a direction of the minimum retardation, which is preferably not present in plane and not present along a normal line of the sheet.

The present invention uses the liquid crystal cell of the bend alignment mode or the HAN mode. The product ($\Delta n \times d$) of a refractive anisotropy ($\Delta n$) of the liquid crystal molecule and a thickness (d) of the liquid crystal layer of the liquid crystal cell is preferably in the range of 300 to 3,000 nm to satisfy the brightness and the viewing angle. The product ($\Delta n \times d$) of the bend alignment mode is more preferably in the range of 700 to 2,000 nm, and most preferably in the range of 800 to 1,800 nm. The product ($\Delta n \times d$) of the HAN mode is more preferably in the range of 350 to 1,000 nm, and most preferably in the range of 400 to 900 nm.

The liquid crystal cell of a vertical alignment mode is used according to a normally white (NW) mode or a normally black (NB) mode. The present invention is particularly effective in the normally white mode.

EXAMPLE 1

(Preparation of liquid crystal cell of bend alignment mode)

A polyimide membrane was formed on a glass plate having an ITO electrode as an orientation layer. The orientation layer was subjected to a rubbing treatment. The rubbing direction on one glass plate was reverse to the rubbing direction on the other plate. The two glass plates were placed by facing the orientation layer with each other. The cell gap (d) was 8 $\mu$m. A liquid crystal molecule having $\Delta n$ of 0.1396 (ZLI1132, Merck & Co., Inc.) was injected into the cell gap to prepare a liquid crystal cell of an optically compensatory bend mode. The product of $\Delta n$ and d was 1,117 nm. The value of $|(nx1-ny1) \times d1|$ was 92 nm.

(Formation of transparent substrate)

In dichloromethane, 2,2'-bis(4-hydroxyphenyl)propane polycarbonate resin (weight average molecular weight: 30,000) was dissolved to obtain a 18 wt. % solution. The solution was defoamed under vacuum to form a dope. The dope was cast on a band, dried at 50° C. for 10 minutes, peeled from the band, and dried at 100° C. for 10 minutes. The obtained film was stretched by 10% along a longitudinal direction at 170° C. to obtain a uniaxially stretched roll film (transparent substrate) having the thickness of 90 $\mu$m.

The optical characteristics of the transparent substrate were measured by using an ellipsometer (AEP-100, Shimazu Seisakusho Co., Ltd.). As a result, the value of $|(nx3-ny3) \times d3|$ was 90 nm, and the value of $\{(n13+n23)/2-n33\} \times d3$ was 225 nm.

(Surface treatment of transparent substrate)

The both surfaces of the transparent substrate were subjected to a corona discharge treatment by using a solid state corona discharger (6KVA, Pillar).

(Formation of adhesive layer)

A coating solution of the following composition was coated on the surface treated transparent substrate by using a wire bar. The coating amount was 10 ml per m². The coated layer was dried at 120° C. for 2 minutes to form an adhesive layer.

| Coating solution for adhesive layer | |
|---|---|
| Gelatin | 1 weight part |
| Water | 1 weight part |
| Acetic acid | 1 weight part |
| Methanol | 50 weight parts |
| Ethylene dichloride | 50 weight parts |
| p-Chlorophenol | 4 weight parts |

(Formation of orientation layer)

A coating solution of the following composition was coated on the adhesive layer by using a slide coater. The coating amount was 25 ml per m². The coated layer was air dried at 60° C. for 60 seconds, and further air dried at 90° C. for 150 seconds to form an orientation layer.

| Coating solution for orientation layer | |
|---|---|
| 10 Wt. % aqueous solution of the denatured polyvinyl alcohol (A) | 24 weight parts |
| Water | 73 weight parts |
| Methanol | 23 weight parts |
| 50 Wt. % aqueous solution of glutaric aldehyde (cross-linking agent) | 0.2 weight part |

The formed layer was subjected to a rubbing treatment. The rubbing direction was parallel to the slow axis of the transparent substrate. The diameter of the rubbing roll was 150 mm, the conveying speed was 10 m per minute, the rubbing angle was 6°, and the rotating speed of the rubbing roll was 1,200 rpm.

(Formation of optically anisotropic layer)

A coating solution of the following composition was coated on the orientation layer by using a wire bar of #6. The sheet was adhered to a metal frame, and heated in a thermostat at 140° C. for 3 minutes to align the discotic compound. The sheet was irradiated with an ultraviolet ray at 140° C. for 1 minutes by using a high pressure mercury lamp of 120 W per cm. The sheet was cooled to room temperature to obtain an optical compensatory sheet (1).

| Coating solution for optically anisotropic layer | |
|---|---|
| The following discotic compound | 1.8 g |
| Trimethylolpropane triacrylate denatured with ethylene oxide (V#360, Osaka Organic Chemical Ltd.) | 0.2 g |
| Cellulose acetate butyrate (CAB-551-0.2, Eastman Chemical) | 0.04 g |
| Cellulose acetate butyrate (CAB-531-1.0, Eastman Chemical) | 0.01 g |
| A photopolymerization initiator (Irgacure 907, Ciba-Geigy) | 0.06 g |
| A sensitizer (Kayacure DETX, Nippon Kayaku Co., Ltd.) | 0.02 g |
| Methyl ethyl ketone | 3.4 g |

(Discotic compound)

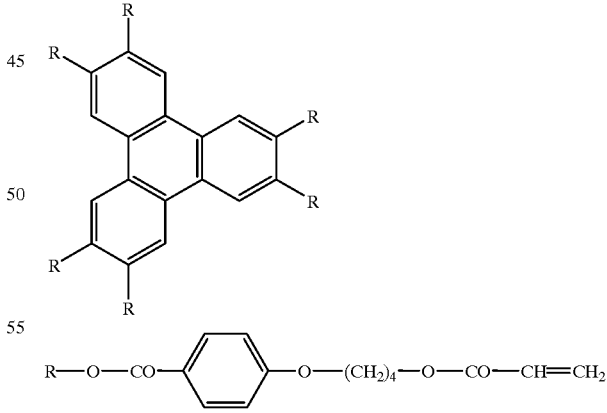

Evaluation of optical compensatory sheet)

The thickness of the optically anisotropic layer was about 2.0 $\mu$m. The retardation value of the optically anisotropic layer was measured along the rubbing direction.

As a result, a direction having retardation of 0 was not found in the optically anisotropic layer.

The average inclined angle of the discotic plane was continuously changed from 4° to 68°. The average inclined angle of the optic axis of the optically anisotropic layer was 36°. The value of |(nx4−ny4)×d4| was 43 nm, and the value of {(n14+n24)/2−n34)×d4 was 135 nm.

The optical compensatory sheet (1) was sliced along the rubbing direction to obtain a ultra-thin section (sample). The sample was placed an atmosphere of $OSO_4$ for 48 hours to dye the sample. The dyed sample was observed with a transparent electron microscope (TEM) to obtain a microscopic photograph. In the sample, the acryloyl group of the discotic compound was dyed to show an image in the photograph.

Upon checking the photograph, the discotic units in the optically anisotropic layer was inclined from the surface plane of the transparent substrate. The inclined angle continuously increased as the distance from the surface of the substrate increased.

The optical characteristics of the optical compensatory sheet (1) were measured. As a result, the value of |(nx2−ny2)×d2| was 47 nm, and the value of {(n12+n22)/2−n32)×d2 was 340 nm.

(Preparation of liquid crystal display)

The two optical compensatory sheets (1) was arranged on both sides of the liquid crystal cell of a bend alignment mode. The optically anisotropic layer of the optical compensatory sheet was faced with the glass plate of the liquid crystal cell. The rubbing direction of the orientation layer of the liquid crystal cell was anti-parallel to the rubbing direction of the orientation layer of the optical compensatory sheet. Two polarizing elements were arranged on the optical compensatory sheet according to a crossed nicols arrangement.

Voltage of a square wave (55 Hz) was applied to the liquid crystal cell of the vertical alignment mode. An image was displayed according to an NW mode (white: 2 V, black: 6 V). A ratio of the transmittance (white/black) was measured as a contrast ratio. The upward, downward, leftward and rightward contrast ratios were measured by using a meter (EZ-Contrast 160D, ELDIM). The results are set forth in Table 1.

EXAMPLE 2

Formation of transparent substrate)

In dichloromethane, 2,2'-bis(4-hydroxyphenyl)propane polycarbonata resin (viscosity average molecular weight: 28,000) was dissolved to obtain a 18 wt. % solution. The obtained solution was cast on a band, dried at 50° C. for 10 minutes, peeled from the band, and dried at 100° C. for 10 minutes. The obtained film was stretched by 15% along a longitudinal direction at 170° C., and was stretched by 5% along a horizontal direction at 175° C. to obtain a biaxially stretched roll film (transparent substrate) having the thickness of 80 μm. The longitudinal stretching was controlled by the difference between the rotating speeds of two chucking rolls. The horizontal stretching was controlled by the width of a tenter.

The optical characteristics of the transparent substrate were measured by using an ellipsometer (AEP-100, Shimazu Seisakusho Co., Ltd.). As a result, the value of |(nx3−ny3)×d3| was 80 nm, and the value of {(n13+n23)/2−n33)×d3 was 280 nm.

(Formation of optical comensatory sheet)

An optical compensatory sheet (2) was prepared in the same manner as in Example 1, except that the above-prepared transparent substrate was used.

(Evaluation of optical compensatory sheet)

The optical characteristics of the optically anisotropic layer of the optical compensatory sheet (2) were the same as those of the optically anisotropic layer of the sheet (1).

The optical characteristics of the optical compensatory sheet (2) were measured. As a result, the value of |(nx2−ny)2)×d2| was 37 nm, and the value of {(n12+n22)/2−n32)×d2 was 400 nm.

(Preparation of liquid crystal display)

A liquid crystal display was prepared and evaluated in the same manner as in Example 1, except that the above-prepared optical compensatory sheet (2) was used. The results are set forth in Table 1.

EXAMPLE 3

(Formation of transparent substrate)

A gelatin layer (thickness: 0.1 μm) was formed on a triacetyl cellulose film (thickness: 100 μm, Fuji TAC, Fuji Photo Film Co., Ltd.). A coating solution containing 1 g of a photo-polymerilable oligomez (UN900PEP, Negami Industries Co., Ltd.), 10 g of tetrahydrofuran and 0.01 g of benzophenone was coated on the gelatin layer. The formed layer was dried at 60° C. for 30 minutes. A nematic liquid crystal compound (ZL14788-100, Merck & Co., Inc.) was coated on the formed layer. The sheet was irradiated with an ultraviolet ray while applying a magnetic field of 5 kG to the sheet horizontally to align and fix the liquid crystal compound. Thus, a transparent substrate having a liquid crystal layer was prepared.

The optical characteristics of the transparent substrate were measured by using an ellipsometer (AEP-100, Shimazu Seisakusho Co., Ltd.). As a result, the value of |(nx3−ny3)×d3| was 94 nm, and the value of {(n13+n23)/2−n33)×d3 was 105 nm.

(Formation of optical compensatory sheet)

An optical compensatory sheet (3) was prepared in the same manner as in Example 1, except that the above-prepared transparent substrate was used (Evaluation of optical compensatory sheet)

The optical characteristics of the optically anisotropic layer of the optical compensatory sheet (3) were the same as those of the optically anisotropic layer of the sheet (1).

The optical characteristics of the optical compensatory sheet (3) were measured. As a result, the value of |(nx2−ny2)×d2| was 51 nm, and the value of {(n12+n22)/2−n32)×d2 was 160 nm.

(Preparation of liquid crystal display)

A liquid crystal display was prepared and evaluated in the same manner as in Example 1, except that the above-preared optical compensatory sheet (3) was used. The results are set forth in Table 1.

COMPARISON EXAMPLE 1

Formation of optical compensatory sheet)

An optical compensatory sheet (4) was prepared in the same manner as in Example 1, except that the rubbing direction of the orientation layer was perpendicular to the slow axis of the transparent substrate.

(Evaluation of optical comnpensatory sheet)

The optical characteristics of the optically anisotropic layer of the optical compensatory sheet (4) were the same as those of the optically anisotropic layer of the sheet (1).

The optical characteristics of the optical compensatory sheet (4) were measured. As a result, the value of |(nx2−ny2)×d2| was 133 nm, and the value of {(n12+n22)/2−$n$32)×$d$2 was 370 nm.

(Preparation of liquid crystal display)

A liquid crystal display was prepared and evaluated in the same manner as in Example 1, except that the above-prepared optical comnpensatory sheet (4) was used. The results are set forth in Table 1.

TABLE I

| Sam-ple | LC cell $\|(nx1 - ny1) \times d1\|$ | OC sheet $\Sigma\|(nx2 - ny2) \times d2\|$ | Viewing angle | | | |
|---|---|---|---|---|---|---|
| | | | U | D | L | R |
| 1 | 92 | 94 | 80+ | 58 | 66 | 66 |
| 2 | 92 | 74 | 80+ | 54 | 62 | 62 |
| 3 | 92 | 102 | 80+ | 55 | 63 | 63 |
| C1 | 92 | 266 | 75 | 49 | 51 | 51 |

(Remark)
Viewing angle: An angle that can view an image having a contrast ratio of not smaller than 10 along upward (U), downward (D), leftward (L) or rightward (R) direction
80+: 80° or more (Preparation of HAN liquid crystal cell)

A polyimide membrane was formed on a glass plate having an ITO electrode as an orientation layer. The orientation layer was subjected to a rubbing treatment. Silicon oxide was evaporated on another a glass plate having an ITO electrode to form an orientation layer. The two glass plates were placed by facing the orientation layer with each other. The cell gap (d) was 4 μm. A liquid crystal molecule having Δn of 0.1396 (ZLI1132, Merck & Co., Inc.) was injected into the cell gap to prepare a liquid crystal cell of a hybrid aligned nematic mode. The product of Δn and d was 558 nn. The value of $|(nx1-ny1)\times d1|$ was 46 nm.

(Preparation of liquid crystal display)

One optical compensatory sheet (1) prepared in Example 1 was arranged on a display side of the liquid crystal cell of a hybrid aligned nematic mode. The optically anisotropic layer of the optical compensatory sheet was faced with the glass plate of the liquid crystal cell. The rubbing direction of the orientation layer of the liquid crystal cell was anti-parallel to the rubbing direction of the orientation layer of the optical compensatory sheet. A polarizing element was arranged on the optical compensatory sheet wherein the angle between the transmittance axis and the rubbing direction of the liquid crystal cell was 45°. A scattering plate was placed on the polarizing element. A mirror (reflecting board) was placed on the reverse side of the liquid crystal cell.

Light was irradiated to the liquid crystal cell of the hybrid aligned nematic mode along the direction inclined by 20° from the normal line of the display surface. Voltage of a square wave (55 Hz) was applied to the liquid crystal cell of the hybrid aligned nematic mode, An image was displayed according to an NW mode (black: 6 V, white: 2 V). A ratio of the transmittance (white/black) was measured as a contrast ratio. The upward, downward, leftward and rightward contrast ratios were measured by using a meter (bm-7, TOPCON). The results are set forth in Table 2.

EXAMPLE 5

A liquid crystal display was prepared and evaluated in the same manner as in Example 4, except that the optical compensatory sheet (2) prepared in Example 2 was used. The results are set forth in Table 2.

EXAMPLE 6

A liquid crystal display was prepared and evaluated in the same manner as in Example 4, except that the optical compensatory sheet (3) prepared in Example 3 was used, The results are set forth in Table 2.

COMPARISON EXAMPLE 2

A liquid crystal display was prepared and evaluated in the same manner as in Example 4, except that the optical compensatory sheet (4) prepared in Comparison Example 1 was used. The results are set forth in Table 2.

TABLE 2

| Sam-ple | LC cell $\|(nx1 - ny1) \times d1\|$ | OC sheet $\|(nx2 - ny2) \times d2\|$ | Viewing angle | | | |
|---|---|---|---|---|---|---|
| | | | U | D | L | R |
| 4 | 46 | 47 | 44 | 26 | 39 | 39 |
| 5 | 46 | 37 | 42 | 25 | 36 | 36 |
| 6 | 46 | 51 | 43 | 36 | 36 | 36 |
| C2 | 46 | 133 | 38 | 21 | 32 | 32 |

(Remark)
Viewing angle: An angle that can view an image having a contrast ratio of not smaller than 10 along upward (U), downward (D), leftward (L) or rightward (R) direction

I claim:

1. A liquid crystal display comprising a liquid crystal cell of a bend alignment mode, two polarizing elements arranged on each side of the liquid crystal cell, and one or two optical compensatory sheets arranged between the liquid crystal cell and each of the polarizing elements, said liquid crystal cell comprising liquid crystal molecules provided between two electrode substrates, and said optical compensatory sheet comprising an optically anisotropic transparent substrate and an optically anisotropic layer containing a discotic compound, wherein the liquid crystal cell, the optical compensatory sheet and the transparent substrate have optical characteristics satisfying the following formulas:

$$|(nx1-ny1)\times d1|-20 \leq \Sigma|(nx2-ny2)\times d2| \leq |(nx1-ny1)\times d1|+20$$

$$50 \leq \{(n12+n22)/2-n32\}\times d2 \leq 1000$$

$$0 \leq |(nx3-ny3)\times d3| \leq 200$$

$$100 \leq \{(n13+n23)/2-n33\}\times d3 \leq 1000$$

in which nx1 and ny1 are main refractive indices in plane of the liquid crystal cell; d1 is the thickness in terms of nm of the liquid crystal cell; nx2 and ny2 are main refractive indices in plane of the optical compensatory sheet, d2 is the thickness in terms of nm of the optical compensatory sheet; $\Sigma|(nx2-ny2)\times d2|$ means the total value of $|(nx2-ny2)\times d2|$ of the one or two optical compensatory sheets; n12, n22 and n32 are main refractive indices of the optical compensatory sheet satisfying the formula of n12≦n22≦n32; nx3 and ny3 are main refractive indices in plane of the transparent substrate; d3 is the thickness in terms of nm of the transparent substrate; and n13, n23 and n33 are main refractive indices of the transparent substrate satisfying the formula of n13≦n23≦n33.

2. The liquid crystal display as defined in claim 1, wherein the transparent substrate comprises two or more optically anisotropic films.

3. The liquid crystal display as defined in claim 1, wherein the transparent substrate comprises a uniaxially or biaxially stretched film.

4. The liquid crystal display as defined in claim 1, wherein the transparent substrate comprises a transparent film and a liquid crystal layer containing positively uniaxial liquid crystal molecules.

5. The liquid crystal display as defined in claim 1, wherein at least one transparent substrate functions as a protective film of the polarizing element.

6. The liquid crystal display as defined in claim 1, wherein the optically anisotropic layer has optical characteristics satisfying the following formulas:

$$0 \leq |(nx4-ny4)\times d4| \leq 200$$

$$50(n14+n24)/2−n34)\times d4 \leq 1000$$

in which nx4 and ny4 are main refractive indices in plane of the optically anisotropic layer; d4 is the thickness in terms of n=of the optically anisotropic layer; and n14, n24 and n34 are main refractive induces of the optically anisotropic layer satisfying the formula of n14≦n24≦n34.

7. The liquid crystal display as defined in claim 1, wherein the discotic compound is aligned in the optically anisotropic layer, and an angle between the discotic plane of the discotic compound and a surface of the transparent substrate increases or decreases with increase of a distance between the discotic plane and the surface of the transparent substrate.

8. The liquid crystal display as defined in claim 7, wherein the discotic compound is aligned in the optically anisotropic layer, and an angle between the discotic plane of the discotic compound and a surface of the transparent substrate increases with increase of a distance between the discotic plane and the surface of the transparent substrate.

9. The liquid crystal display as defined in claim 1, wherein the liquid crystal cell is of a normally white mode.

10. A liquid crystal display comprising a liquid crystal cell of a hybrid aligned nematic mode, an optical compensatory sheet and a polarizing element in the order, said liquid crystal cell comprising liquid crystal molecules provided between two electrode substrates, and said optical compensatory sheet comprising an optically anisotropic transparent substrate and an optically anisotropic layer containing a discotic compound, wherein the liquid crystal cell, the optical compensatory sheet and the transparent substrate have optical characteristics satisfying the following formulas:

$$|(nx1−ny1)\times d1|−20 \leq |(nx2−ny2)\times d2| \leq |(nx1−ny1)\times d1|+20$$

$$50 \leq \{(n12+n22)/2−n32)\times d2 \leq 1000$$

$$0 \leq |(nx3−ny3)\times d3| \leq 200$$

$$100 \leq \{(n13+n23)/2−n33)\times d3 \leq 1000$$

in which nx1 and ny1 are main refractive indices in plane of the liquid crystal cell; d1 is the thickness in terms of ni of the liquid crystal cell; nx2 and ny2 are main refractive indices in plane of the optical compensatory sheet satisfying the formula of nx2≦ny2; d2 is the thickness in terms of nm of the optical compensatory sheet; n12, n22 and n32 are main refractive indices of the optical compensatory sheet satisfying the formula of n12≦n22≦n32; nx3 and ny3 are main refractive indices in plane of the transparent substrate; d3 is the thickness in terms of nm of the transparent substrate; and n13, n23 and n33 are main refractive indices of the transparent substrate satisfying the formula of n13≦n23≦n33.

11. The liquid crystal display as defined in claim 10, wherein the transparent substrate comprises two or more optically anisotropic films.

12. The liquid crystal display as defined in claim 10, wherein the transparent substrate comprises a uniaxially or biaxially stretched film.

13. The liquid crystal display as defined in claim 10, wherein the transparent substrate comprises a transparent film and a liquid crystal layer containing positively uniaxial liquid crystal molecules.

14. The liquid crystal display as defined in claim 10, wherein at least one transparent substrate functions as a protective film of the polarizing element.

15. The liquid crystal display as defined in claim 10, wherein the optically anisotropic layer has optical characteristics satisfying the following formulas:

$$0 \leq |(nx4−ny4)\times d4| \leq 200$$

$$50 \leq \{(n14+n24)/2−n34)\times d4 \leq 1000$$

in which nx4 and ny4 are main refractive indices in plane of the optically anisotropic layer; d4 is the thickness in terms of nm of the optically anisotropic layer; and n14, n24 and n34 are main refractive indices of the optically anisotropic layer satisfying the formula of n14≦n24≦n34.

16. The liquid crystal display as defined in claim 10, wherein the discotic compound is aligned in the optically anisotropic layer, and an angle between the discotic plane of the discotic compound and a surface of the transparent substrate increases or decreases with increase of a distance between the discotic plane and the surface of the transparent substrate.

17. The liquid crystal display as defined in claim 16, wherein the discotic compound is aligned in the optically anisotropic layer, and an angle between the discotic plane of the discotic compound and a surface of the transparent substrate increases with increase of a distance between the discotic plane and the surface of the transparent substrate.

18. The liquid crystal display as defined in claim 10, wherein the liquid crystal cell is of a normally white mode.

* * * * *